(12) United States Patent  
Reeves

(10) Patent No.: US 6,439,397 B1
(45) Date of Patent: Aug. 27, 2002

(54) RETENTION ARM FOR GEAR RACKS

(75) Inventor: Michael K. Reeves, Woodinville, WA (US)

(73) Assignee: Sportworks Northwest, Inc., Woodinville, WA (US)

( * ) Notice: Subject to any disclaimer, the term of this patent is extended or adjusted under 35 U.S.C. 154(b) by 0 days.

(21) Appl. No.: 09/656,011

(22) Filed: Sep. 6, 2000

(51) Int. Cl.[7] .................................................. A47F 5/00
(52) U.S. Cl. ........................ 211/17; 224/324; 224/924
(58) Field of Search ............................ 211/17, 19, 20; 248/291.1, 286.1; 224/924, 323, 324, 326, 327

(56) References Cited

U.S. PATENT DOCUMENTS

| | | | | |
|---|---|---|---|---|
| 1,422,502 A | * | 7/1922 | Wark | |
| 4,081,118 A | * | 3/1978 | Mason | |
| 4,126,228 A | * | 11/1978 | Bala et al. ................. | 211/22 X |
| 4,345,705 A | * | 8/1982 | Graber | |
| 4,442,961 A | * | 4/1984 | Bott ......................... | 211/20 X |
| 4,452,384 A | * | 6/1984 | Graber ..................... | 211/20 X |
| 4,524,893 A | * | 6/1985 | Cole ......................... | 211/5 X |
| 4,681,247 A | * | 7/1987 | Prosen ..................... | 224/324 X |
| 4,702,401 A | * | 10/1987 | Graber et al. | |
| 4,733,810 A | * | 3/1988 | Graber et al. ............. | 211/17 X |
| 4,940,175 A | * | 7/1990 | Tittel ......................... | 224/324 |
| 5,119,980 A | | 6/1992 | Grim et al. | |
| 5,169,044 A | * | 12/1992 | Englander et al. ........ | 211/20 X |
| 5,203,484 A | | 4/1993 | Englander | |
| 5,435,475 A | | 7/1995 | Hudson et al. | |
| 5,445,300 A | * | 8/1995 | Eipper et al. ........... | 224/924 X |
| 5,456,396 A | * | 10/1995 | Allen ......................... | 224/321 |
| 5,476,201 A | * | 12/1995 | Hall et al. ................. | 224/924 X |
| 5,582,044 A | | 12/1996 | Bolich | |
| 5,607,064 A | * | 3/1997 | Fourel ...................... | 211/22 X |
| 5,624,063 A | * | 4/1997 | Ireland ..................... | 224/924 X |
| 5,762,248 A | | 6/1998 | Englander et al. | |
| 5,820,002 A | * | 10/1998 | Allen ........................ | 224/924 X |
| 6,164,507 A | * | 12/2000 | Dean et al. ............... | 224/324 |
| 6,296,162 B1 | * | 10/2001 | Englander et al. ........ | 224/324 |

* cited by examiner

Primary Examiner—Robert W. Gibson, Jr.
(74) Attorney, Agent, or Firm—Dellett and Walters

(57) ABSTRACT

A rack arm rotatably mounts to a cross bar of a rack system. Multiple cross sectional shape cross bars are accommodated, enabling use with different rack styles. The rack arm rotates into position to engage an item of gear placed in the rack for securing the gear item to the rack.

14 Claims, 5 Drawing Sheets

RETENTION ARM FOR GEAR RACKS

BACKGROUND OF THE INVENTION

This invention relates to gear racks, and more particularly, to a gear retention system for use with gear racks.

Vehicle racks for carrying bicycles or other wheeled vehicles or sports gear (such as canoes, surfboards, etc.) need to secure the gear to the rack, to ensure that the gear does not get bounced out of the rack as a result of road conditions or sudden stops, etc.

For example, with bicycles, there are two popular styles of securing bicycles to racks, particularly when considering roof racks. The fork mount style employs a receiving member on the rack that is adapted to clamp to the front fork of the bicycle. A disadvantage to this style is that the front wheel of the bicycle must be removed to attach the bicycle to the rack. Some people prefer not to have to remove the wheel. Another style employs a clamp that attaches to the bicycle's frame. Both wheels remain on the bicycle in this style. However, some cyclists are reluctant to use the clamping style racks, fearing that the clamps might damage the finish of the bicycle frame as a result of vibration during transport.

There are two popular styles of roof rack systems for vehicles. One system employs cross bars (the bars extending from one lateral side of the roof rack system to the other lateral side) having a rectangular shape, while the other system uses circular shaped cross bars. Heretofore, having purchased one style or the other, a user had to purchase equipment specifically adapted to mount to that style of system.

As an attempt to overcome some of the above disadvantages, for bicycles, a clamping mechanism that secures the bicycle by attachment to the pedal and crank has been devised. The axis of rotation of the clamping mechanism is separate from the cross bar axis, and a substantial secondary structure is required to carry the side loads arising from the bicycle trying to tip over. The mounting mechanism transfers the load to the cross bar, but adds cost to the overall system.

SUMMARY OF THE INVENTION

In accordance with the invention, a rack arm is provided that rotatably mounts to the cross bars of a rack for sports gear. The arm rotates about the cross bar, causing the side loads to be carried by the cross bar.

Accordingly, it is an object of the present invention to provide an improved sports gear rack arm adapted to rotatably mount to the cross bars of different style rack systems.

It is a further object of the present invention to provide an improved rack arm that rotates about a rack cross bar and enables a bicycle to be secured to a roof rack system without attaching to the bicycle's frame.

It is yet another object of the present invention to provide an improved rack arm that enables a bicycle to be secured to a roof rack system via the rack's cross bar without requiring removal of the bicycle's wheel.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a bearing that clamps to the cross bar of a sports gear rack, rotatably carrying a bicycle tire engaging arm thereon.

Figure 1:
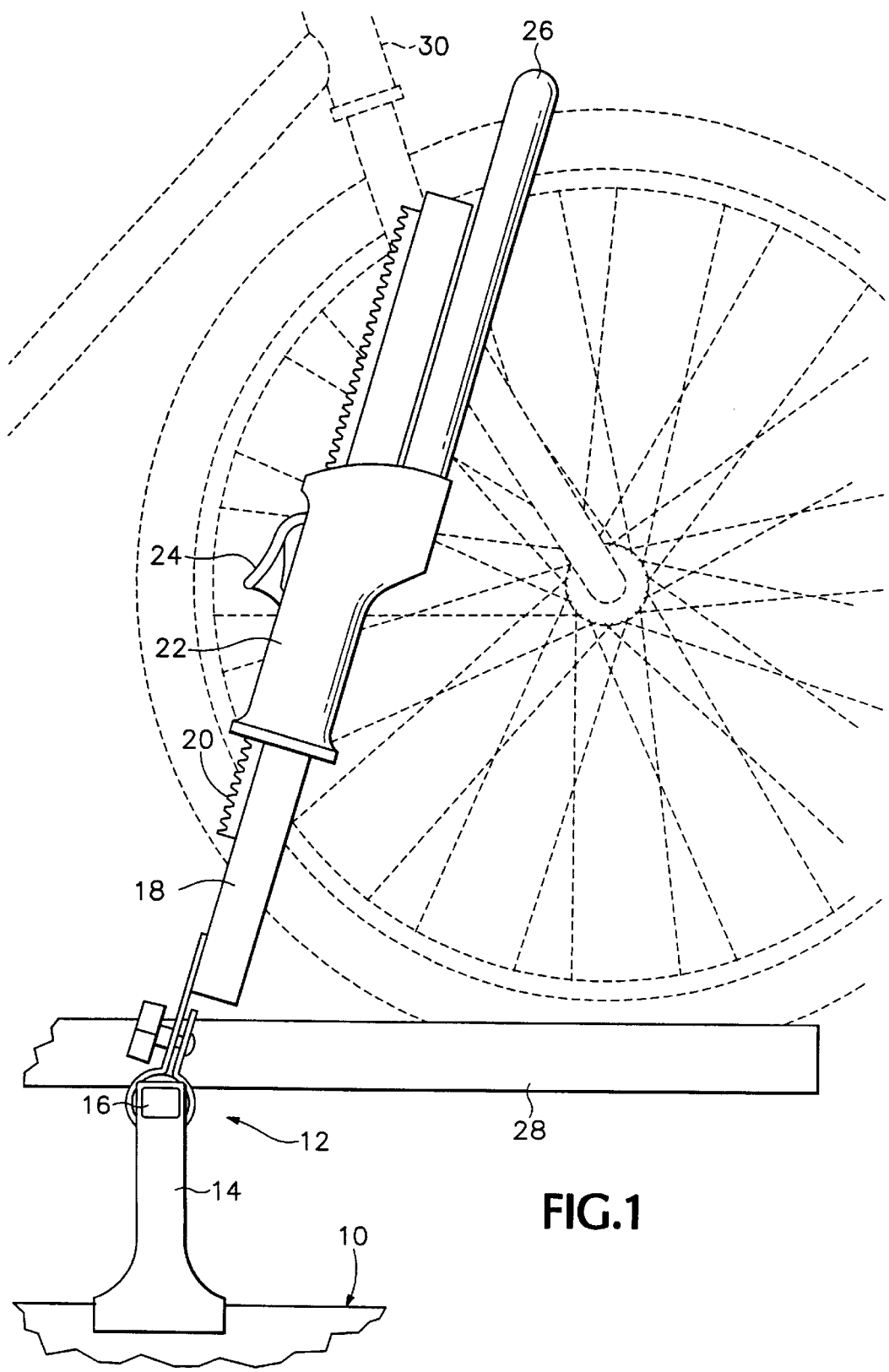
FIG. 1 is a side view of the retention arm as mounted to a vehicle roof top bicycle rack.

Referring now to FIG. 1, a side view of the retention arm as mounted to a vehicle roof top bicycle rack, a vehicle 10 has a roof top rack system 12 mounted thereon, via standoff supports 14 (one such support being visible in FIG. 1). The standoff supports are suitably mounted at front and rear positions on the vehicle roof, and at left and right sides of the vehicle. A cross bar 16 is supported and secured between each of the left front and right front standoffs, and the left rear and right rear standoffs. An elongate ratchet arm assembly 18 rotatably mounts to the cross bar 16, and includes a toothed rack 20 along an extent thereof. A grip member 22 slidingly engages the rack portion, including a release trigger 24 thereon, and carrying a wheel hook arm 26 at an end most distal from the end of the arm assembly 18 mounted to the cross bar.

A wheel tray 28 attaches to the front and rear cross bars, suitably extending at least at one end thereof some distance beyond the area bounded by the front and rear cross bars. A wheeled vehicle (such as bicycle 30, illustrated in phantom in FIG. 1) is suitably received in the wheel tray, and is secured in place by engagement of the wheel hook arm 26 with the tire on the bike wheel.

Figure 2:
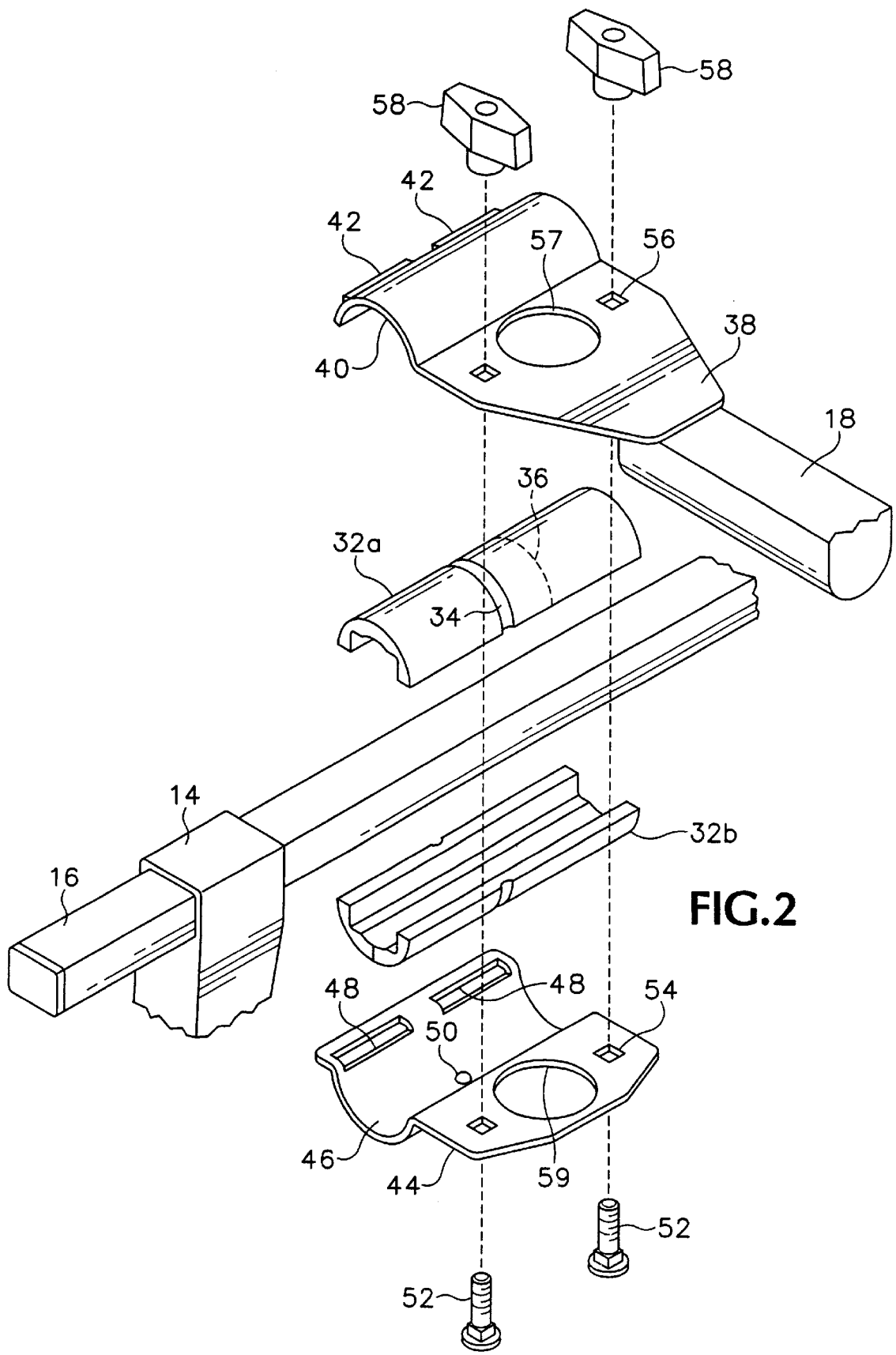
FIG. 2 is an exploded view of the mounting components of the retention arm.

Referring now to FIG. 2, an exploded view of the mounting components of the retention arm, the manner of attaching the wheel retention arm to the cross bar 16 may be better understood. The mounting assembly includes a pivot bearing 32, which is provided as upper and lower portions 32a and 32b. The pivot bearing is suitably plastic, vinyl or an ultra high molecular weight plastic, for example. The interiors of the pivot bearing portions are shaped with a profile to correspond to the profile of the cross bar, so that when the two pieces 32a and 32b of the pivot bearing are brought together, they engage the cross bar. The external profile of the pivot bearing is circular. A bearing groove 34 is defined in each portion of the pivot bearing, so as to define a circumferential groove around the exterior profile of the pivot bearing when portions 32a and 32b are brought together. The groove is suitably defined off of the center line 36 of the bearing. The ratchet arm assembly 18 has a first bearing clamp portion 38 mounted thereto, including a semicircular portion 40 having a profile corresponding to the exterior profile of the pivot bearing portions. A pair of spaced nibs 42 are defined at the edge of the clamp portion most distal from the arm portion of the assembly.

A second bearing clamp portion 44 is provided, with a semicircular portion 46, corresponding in profile to the exterior profile of the pivot bearing portions. First and second slots 48 are defined in the clamp portion 44, corresponding to spaced nibs 42 of the first clamp portion. Inside the semicircular portion 46, a raised dimple 50 is provided. A corresponding dimple 50' may be provided in the semicircular portion of bearing clamp 38. Dimple 50 is sized to fit into the bearing groove 34. A pair of threaded mounting bolts 52 are received through mounting holes 54 in the second bearing clamp portion 44, through holes 56 in the first bearing clamp portion 38, and are threadably engaged by wing nuts 58. The first clamp portion has an opening 57 defined therein, and a corresponding opening 59 is defined in the second clamp portion.

Figure 3:
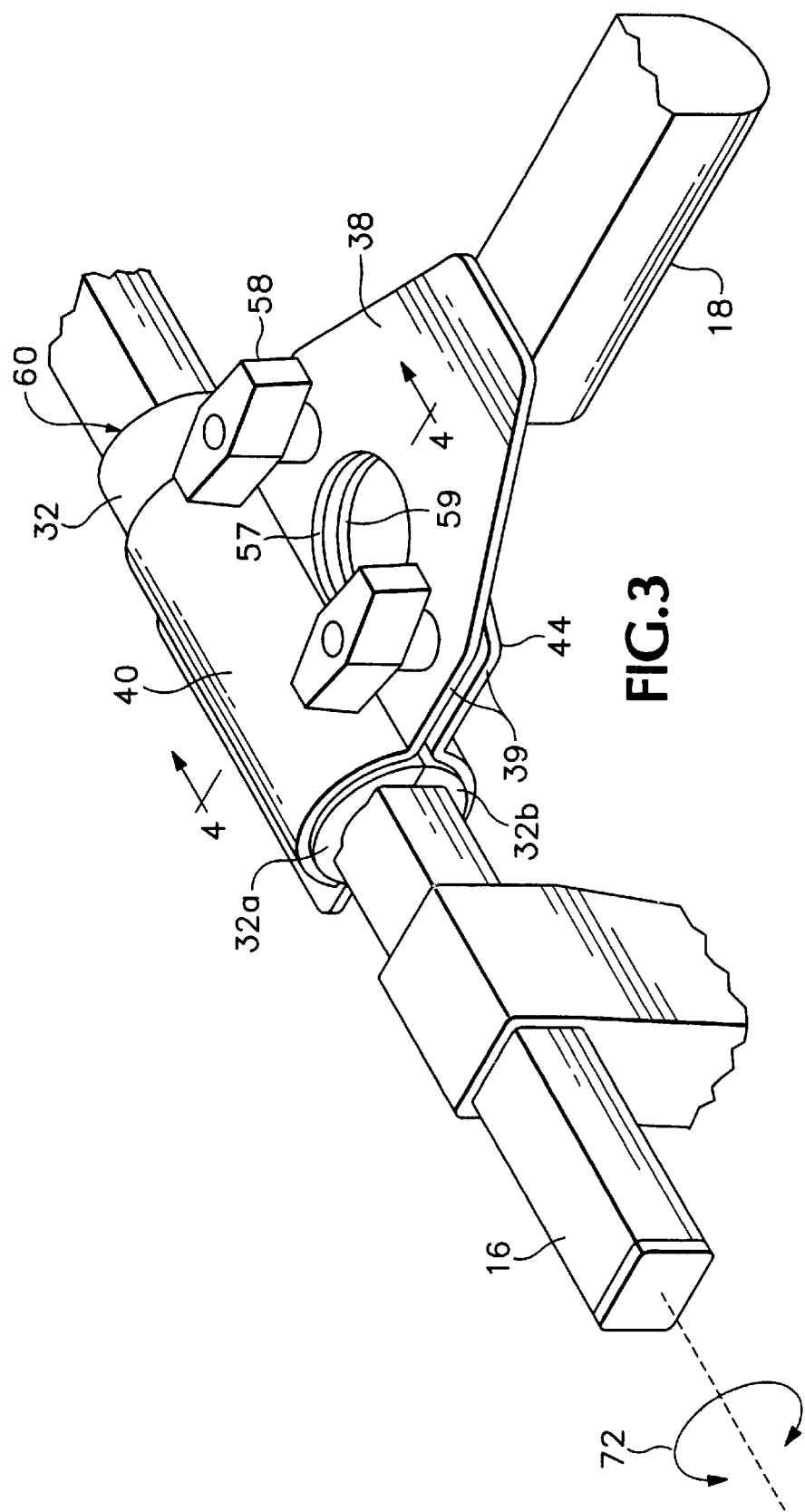
FIG. 3 is a view of the mounting components of FIG. 2, in assembled form.

Referring to FIG. 3, a view of the mounting components of FIG. 2, in assembled form, together with FIG. 2, to mount the assembly to cross bar 16, the two pivot bearing portions are placed around the cross bar, with their respective bearing groove portions 34 aligned. Second bearing clamp portion 44 and first bearing clamp portion 38 are brought close to the bearing portion, aligning dimple 50 with the bearing groove 34, and the clamp portions are connected, by inserting the nib portions 42 of the first clamp portion into the corresponding slots 48 of the second clamp portion. The mounting bolts 52 are inserted through the holes 54, 56, and wing nuts 58 are threaded onto the bolts, and are tightened down. The bearing portion 32 suitably remains stationary relative to the cross bar, while the bearing clamp (comprising portions 38 and 44) is able to rotate about the bearing. The alignment of the bearing clamp longitudinally along the bearing portion is maintained by the engagement of dimple 50 with bearing groove 34. When mounted as in FIG. 3, the arm 18 is able to rotate about the axis of the cross bar, as shown by arc 72. The openings 57 and 59 align when the clamp is assembled, providing an opening through which a locking cable may be passed, for the purpose of locking a bicycle stored on the rack so as to prevent theft. When the clamp is closed, a small separation 39 may be present between the two clamp portions.

Figure 4:
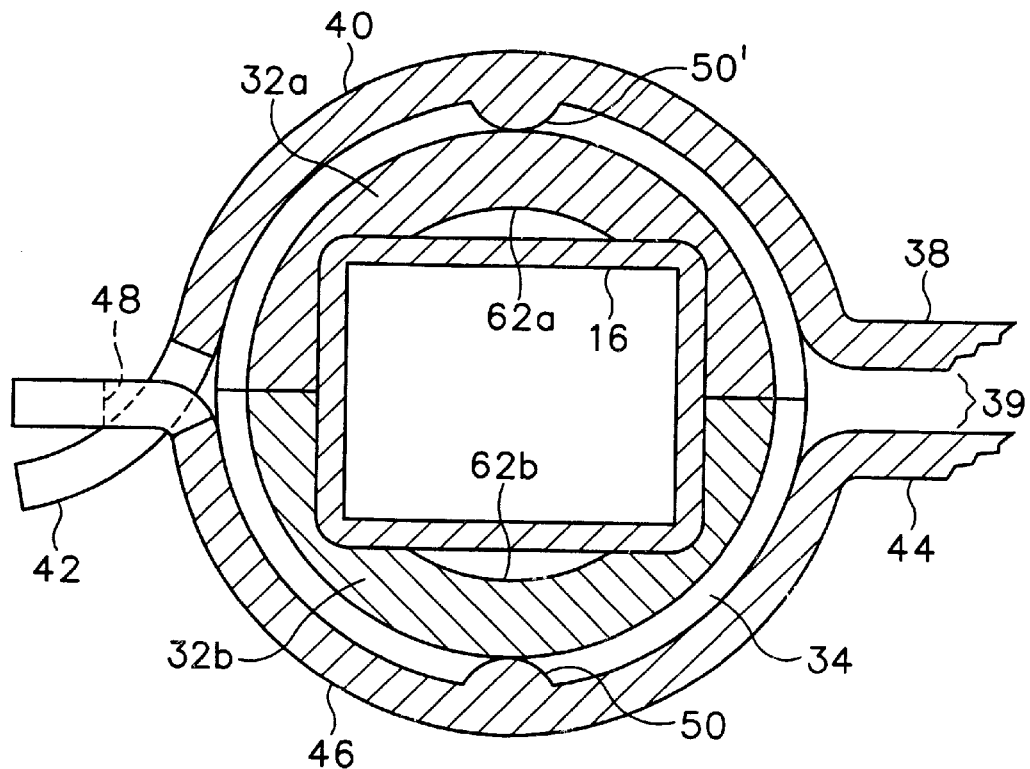
FIG. 4 is a sectional view of the mounting components taken along line 4—4 of FIG. 3.
Figure 5:
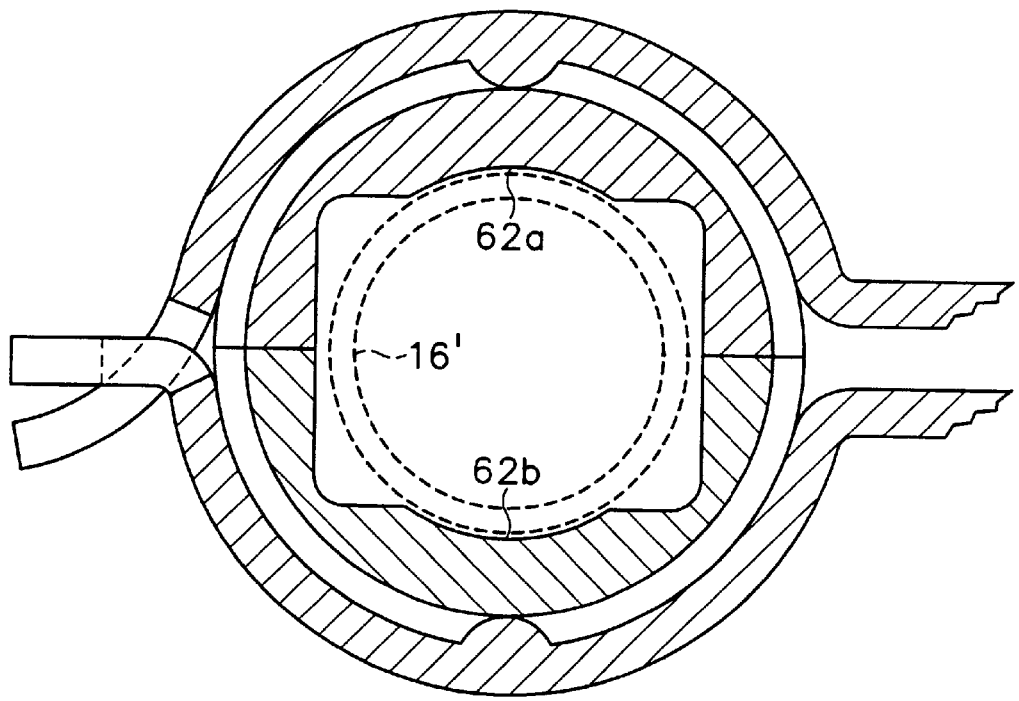
FIG. 5 is a sectional view of the mounting components taken along line 4—4 of FIG. 3, when mounted on a cross bar having a circular cross section.

FIG. 4 is a sectional view of the mounting components taken along line 4—4 of FIG. 3. As may be observed, the interior profile of the bearing member portions 32a and 32b define rectangular shaped corner portions, so as to fit and engage with the rectangular profile of the cross bar 16. Also provided in the two bearing members are partial circular profiles 62a and 62b. These profiles accommodate circular cross section cross bars. FIG. 5. is a cross sectional view of the mounting components as engaged to a circular cross section cross bar 16'. The interior profile of the bearing portions can also be modified to engage with cross bars having other profiles than those shown. For example, a cross bar with an oval, triangular, square, octagonal, etc. profile is suitably accommodated, with corresponding changes to the interior profile of the bearing portions.

Figure 6:
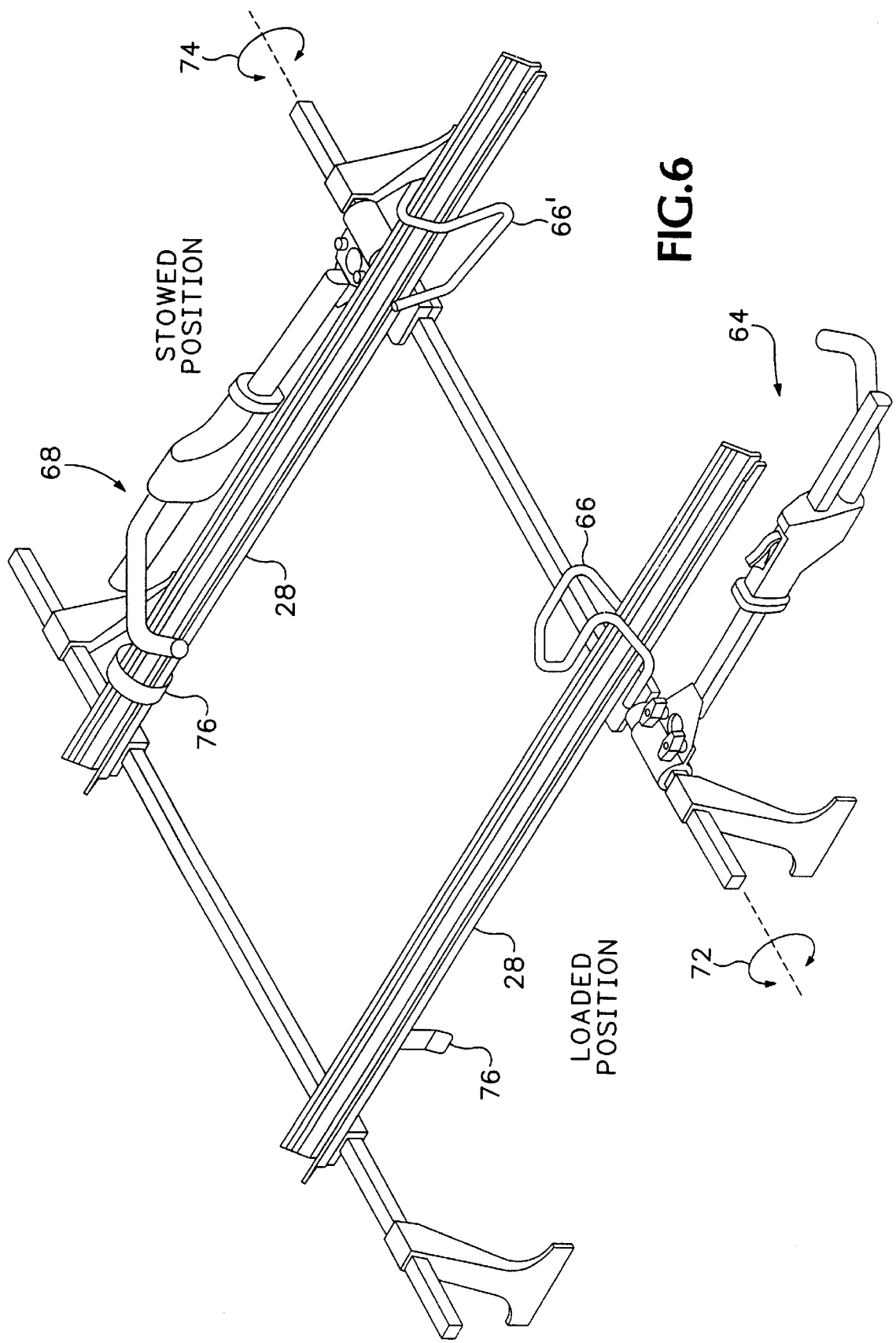
FIG. 6 is a perspective view of a bicycle roof rack with two wheel trays and two retention arms.

FIG. 6 is a perspective view of a bicycle roof rack with two wheel trays and two retention arms attached thereto. The left most arm at 64 is rotated forwardly to a loading position, wherein the rack is ready to receive a bicycle therein. A wheel retainer 66 is shown, to engage the back portion of the front wheel of a bicycle. The second, right most arm at 68, is rotated counterclockwise, to a stowed position, when a bicycle is not present. The axis of rotation of the arms are illustrated at 72, 74. Note also that the wheel retainer 66' is moved counterclockwise to a stowed position, relative to the retainer 66.

As may be observed in FIG. 3, when the bearing clamp is assembled, one end 60 of the bearing portion 32 extends beyond the bearing clamp, as a result of the bearing groove being off center on the bearing and the cooperation with dimple 50. Thus, the bearing portion also acts as a spacer member, such that the pivoting arm is kept a specific distance away from the wheel tray. This provides a desired alignment between the wheel arm and the wheel of the bicycle, without requiring any special measuring by the user. The user merely clamps the bearing portions so that the end 60 of the bearing 32 abuts a mounting bracket for the wheel tray of FIG. 6. Therefore, by providing a bearing portion 32 of a certain length, and positioning the bearing groove 34, alignment of the mounted rack arm relative to the wheel tray is easily accomplished, maintaining a desired spacing 70 (see FIG. 6) without requiring any measurement or other alignment considerations by the user.

Also shown in FIG. 6 is a strap member 76, suitably comprising a hook and look type fastening system, for securing the wheel that is not being held by the rack arm to the wheel tray.

In use, to load a bicycle onto the rack, the ratchet arm is extended forwardly (as at 64 in FIG. 6) and the wheel retainer 66 is moved to the position in the left portion of FIG. 6. The bicycle (or other wheeled vehicle) is placed onto the wheel tray and rolled so the tire back (either front or rear tire) is resting against the wheel retainer. The hook arm is rotated counterclockwise (in the view of FIG. 6) so that the hook arm portion is positioned at the top of the tire (see FIG. 1). The handle 22 is pulled downwardly to secure the bike to the rack. The ratchet action between the handle and the rack 20 holds the hook in position, until the release 24 is pressed. Strap 76 is then secured around the other wheel of the bicycle.

When the arm is in the stowed position 68 of FIG. 6, the strap is suitably secured around the arm to keep it in the stowed position.

Therefore, according to the present invention, a rack arm is suitably mounted to a rack cross bar, and is adapted to rotate about the cross bar. Thus, an arm or clamp engages an article placed in the rack (where the article is e.g., a bicycle or other sporting gear), to assist in keeping the article in the rack. In the preferred embodiment, the arm is mounted so its rotational axis is coaxial with the cross bar, although other configurations may be employed.

It will be understood that while the illustrated embodiment is employed in the context of a bicycle rack, the invention is not limited to such uses. The invention is suitably used with other gear racks, whether for sport gear or not. For example, canoe racks, surfboard racks, windsurfer gear racks and the like are suitably adapted to use of the invention. In such case, modification to the arm mechanism that engages the gear may be desired. In the case of a canoe, for example, the canoe is positioned on it rack, and then the arm according to the invention is rotated into position so as to engage the canoe. A clamping mechanism, such as a screw clamp, is carried on the arm, and is rotated to engage the gunwale of the canoe. Once in position where it engages the gunwale, the screw clamp is tightened, securing the canoe to the rack. Accordingly, the invention may be employed with various types of racks for securing items, while keeping within the scope of the invention.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A securing member for a rack for assisting in securing an article to the rack, wherein the rack comprises at least one cross bar, the securing member comprising:

an article engaging member for attaching to the article; and a rotational attachment member for engaging the at least one cross bar and for rotationally attaching the article engaging member to the cross bar, enabling the article engaging member to rotate about the cross bar, wherein said rotational attachment member includes a bearing member and a clamping member, for releasably engaging the cross bar, and wherein the bearing member at least partially surrounds the cross bar and includes a profile adapted for accommodating cross bars of more than one profile.

2. The securing member for a rack according to claim 1, wherein the more than one profile comprise a circular profile and a rectangular profile.

3. The securing member for a rack according to claim 1, wherein said article engaging member comprises an arm having a hook member thereon adapted for engaging a bicycle.

4. An arm for a bicycle rack, wherein the bicycle rack includes a cross bar, the arm comprising:

a clamping member for attaching the arm to the cross bar of the bicycle rack; and a bearing member for enabling the arm to rotate about the cross bar.

5. The arm for a bicycle rack according to claim 4, wherein said bearing member at least partially surrounds the cross bar.

6. The arm for a bicycle rack according to claim 4, wherein the bearing member attaches to the cross bar and includes a profile adapted for accommodating cross bars of more than one profile.

7. The arm for a bicycle rack according to claim 6, wherein the more than one profile comprise a circular profile and a rectangular profile.

8. A method for installing an article on a carrying rack, the carrying rack including at least one cross bar, the method comprising the steps of:

providing a rotational attachment of an article engaging member to the at least one cross bar; and rotating the article engaging member about the cross bar into a position for securing the article in the rack when loading the article onto the carrying rack, wherein said step of providing a rotational attachment comprises clamping a bearing member to the at least one cross bar, and wherein said step of providing a rotational attachment further comprises providing a bearing member adapted to engage cross bars of more than one profile.

9. The method according to claim 8, wherein said step of providing a rotational attachment further comprises coupling said article engaging member with said bearing member.

10. The method according to claim 8, wherein said step of clamping comprises removably clamping.

11. The method according to claim 10, wherein the more than one profile comprise a circular profile and a rectangular profile.

12. A rack for carrying sporting gear thereon, comprising:

a cross bar member;

a clamp adapted to engage the sporting gear, said clamp being rotationally mounted to the cross bar for rotation thereabout, wherein said clamp includes a bearing member and a clamping member, for releasably engaging the cross bar, and wherein the bearing member at least partially surrounds the cross bar and includes a profile adapted for accommodating cross bars of more than one profile.

13. The rack according to claim 12, wherein the more than one profile comprise a circular profile and a rectangular profile.

14. The rack according to claim 12, wherein said clamp comprises an arm having a hook member thereon, and wherein the sporting gear comprises a bicycle, said hook member being adapted for engaging the bicycle.

* * * * *